US 8,899,641 B2

(12) United States Patent
Mohacsi

(10) Patent No.: US 8,899,641 B2
(45) Date of Patent: Dec. 2, 2014

(54) AUTOMOTIVE BUMPER ASSEMBLY

(71) Applicant: Toyota Motor Engineering & Manufacturing, North America, Inc., Erlanger, KY (US)

(72) Inventor: Kristopher A. Mohacsi, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/653,892

(22) Filed: Oct. 17, 2012

(65) Prior Publication Data
US 2014/0103669 A1    Apr. 17, 2014

(51) Int. Cl.
B60R 19/22    (2006.01)

(52) U.S. Cl.
USPC .......................................................... 293/120

(58) Field of Classification Search
CPC .. B60R 19/24; B60R 19/02; B60R 2019/1886
USPC .................. 293/109, 107, 102, 120; 296/121
See application file for complete search history.

(56) References Cited

U.S. PATENT DOCUMENTS 4,917,944 A    4/1990  Breitscheidel et al.
6,983,964 B2 *  1/2006  Murata et al. ................. 293/109

OTHER PUBLICATIONS

Nitto Denko, EPT Sealer product information, printed from http://www.nitto.com/product/industry/automobile/index.html on Sep. 24, 2012 in 9 pages.

* cited by examiner

Primary Examiner — Joseph D Pape
Assistant Examiner — Dana Ivey
(74) Attorney, Agent, or Firm — Christopher G. Darrow; Young Basile Hanlon & MacFarlane P.C.

(57) ABSTRACT

An automotive bumper assembly and compression member for use therein. The assembly including a compression member has a first compressible region that contacts an outwardly oriented facing surface of a bodyside outer element and a second compressible region composed of a foamed polymeric material that rests in contact with an inwardly oriented surface of an outer bumper cover member. The first and second compressible regions each exhibit compressibility values with the compressibility value of the second compressible region being greater than the compressibility value of the first compressible region.

18 Claims, 3 Drawing Sheets

AUTOMOTIVE BUMPER ASSEMBLY

BACKGROUND

The present invention is directed to an automotive bumper assembly that exhibits reduced incidence of visibly perceived road and/or speed-induced vibration and/or oscillation of fascia components such as bumper covers and the like.

Bumper regions on many automotive vehicles can have various configurations. In certain vehicle configurations such as frameless or unibody configurations, the bumper region will include a structural member or members that is attached to and projects from the body-in-white structure. One such structure is a bodyside outer element. Forces that occur in various impact events can be absorbed by the bodyside outer element and/or transferred to various associated members of the vehicle structure in a controlled manner. For reasons that are not limited to aesthetics and aerodynamic performance, the vehicle structure may also include an outer bumper cover that is connected to the body-in-white in a suitable fashion and is suspended over the bodyside outer element.

The outer bumper cover can be constructed from suitable polymers such as various engineered plastics and the like. Use of such materials permits a wide variety of geometric configurations based on the design consideration and requirements of the associated vehicle. Such materials also provide advantages in that they are light weight and can be made very thin in order to reduce total vehicle weight. Reduction in outer bumper cover thickness is limited because the contour of the underlying surfaces that contact the outer bumper cover can be transferred through the bumper cover and perceived by the consumer.

It has been found that the outer bumper cover can begin to oscillate when the vehicle is driven at speed. This oscillation is undesirable. It is desirable to provide a structure and device that can address, reduce or eliminate outer bumper cover oscillation.

SUMMARY

The present disclosure is directed to a compression member and an associated automotive bumper assembly. The automotive bumper assembly includes a bodyside outer element connected to the associated vehicle structure, and outer bumper cover and a compression member interposed between the bodyside outer element and the outer bumper cover. The compression member is composed of a first compressible region in proximate contacting relationship to the bodyside outer element and a second compressible member oriented proximate to the outer bumper cover.

BRIEF DESCRIPTION OF THE DRAWINGS

The various features, advantages and other uses of the present apparatus will become more apparent by referring to the following detailed description and drawing in which.

DETAILED DESCRIPTION

The present disclosure is directed to a bumper assembly and a compression member for use therein. As disclosed herein, the bumper assembly is composed of a bodyside outer element that is connected to the associated vehicle structure when in the use position. The assembly also includes an outer bumper cover member that is connected to the associated vehicle structure when in the use position. The outer bumper cover is configured to overlie at least a portion of the bodyside outer element in spaced relationship thereto. The compression member is interposed between the bodyside outer element and the outer bumper cover and is composed of a first compressible region having a first compressibility value that is positioned proximate to the bodyside outer element and a second compressible region composed of a polymeric foam having a second compressibility value that is positioned proximate to the outer bumper cover. The compressibility value of the second compressible region is greater than the compressibility value of the first compressible region.

Figure 1:
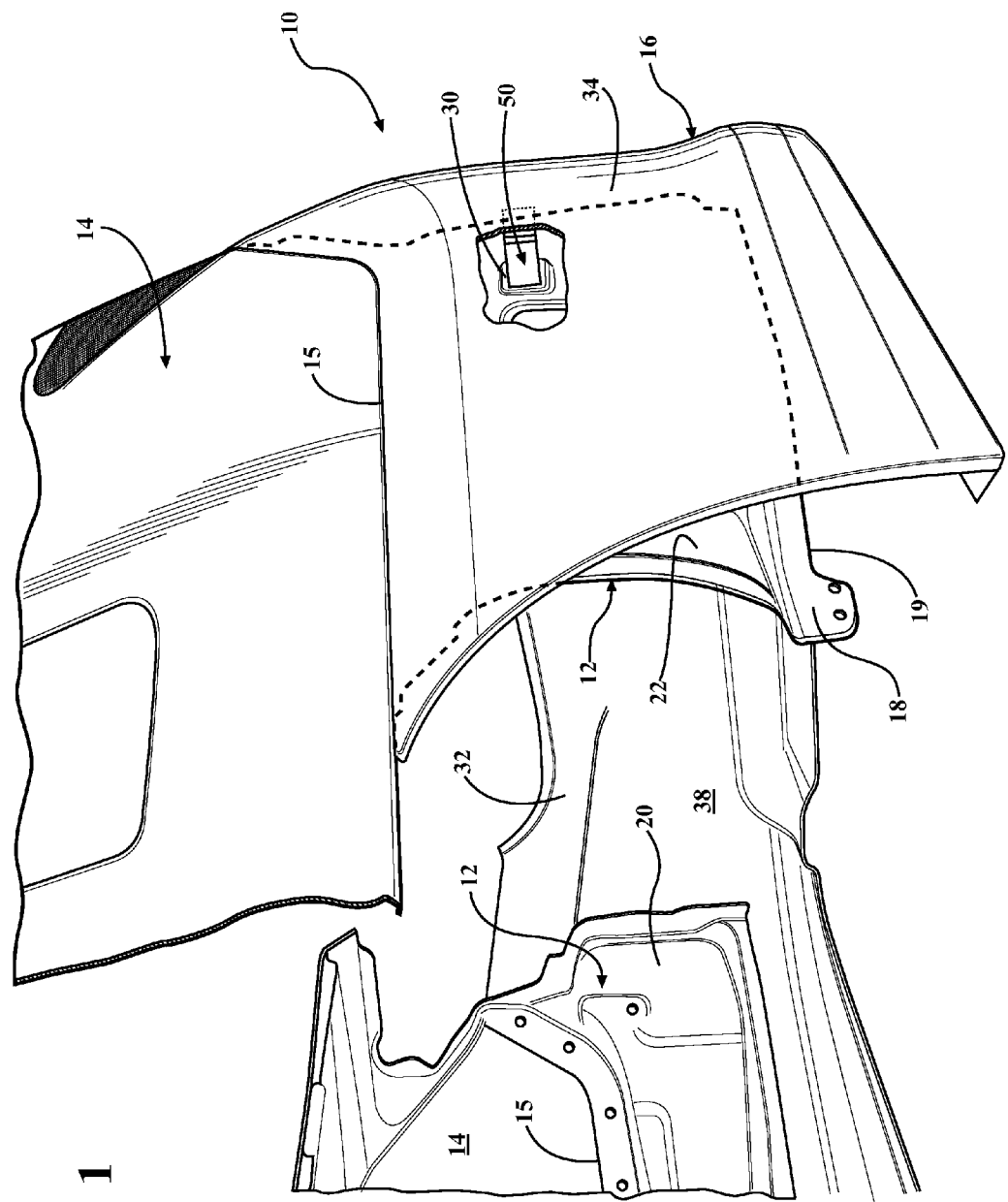
FIG. 1 is perspective partial cutaway view of an embodiment of the bumper assembly as disclosed herein as viewed from the first side of the associated automotive vehicle.
Figure 2:
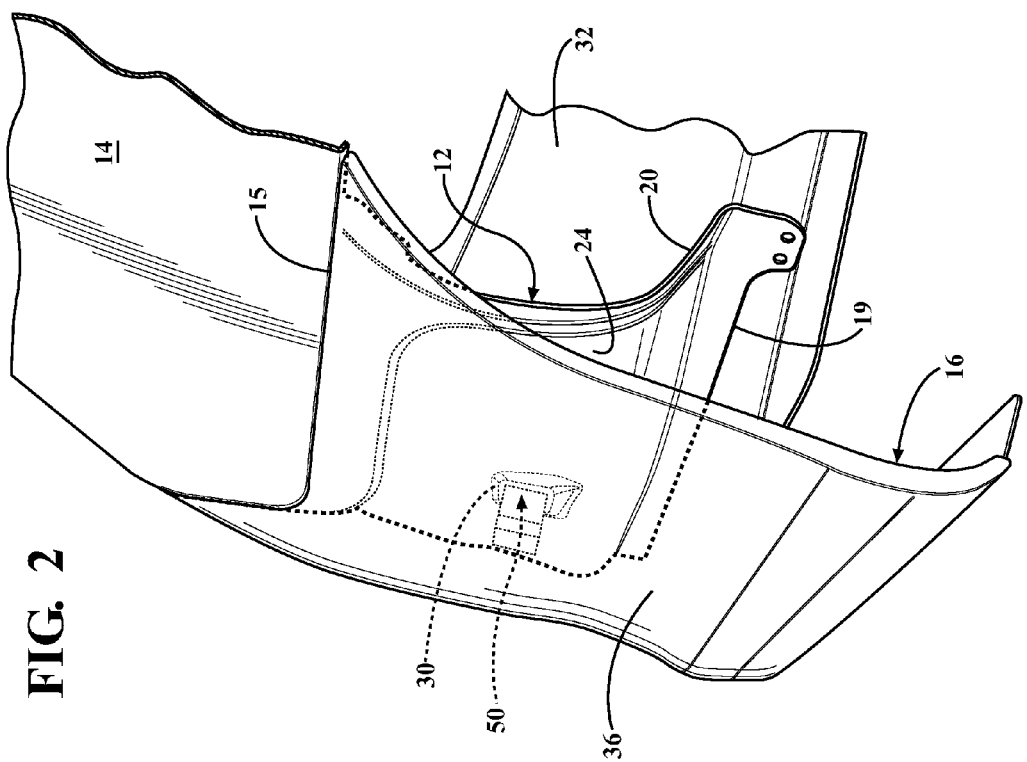
FIG. 2 is perspective view of the bumper assembly of FIG. 1 as disclosed herein as viewed from the second opposed side as see in FIG. 1.
Figure 5:
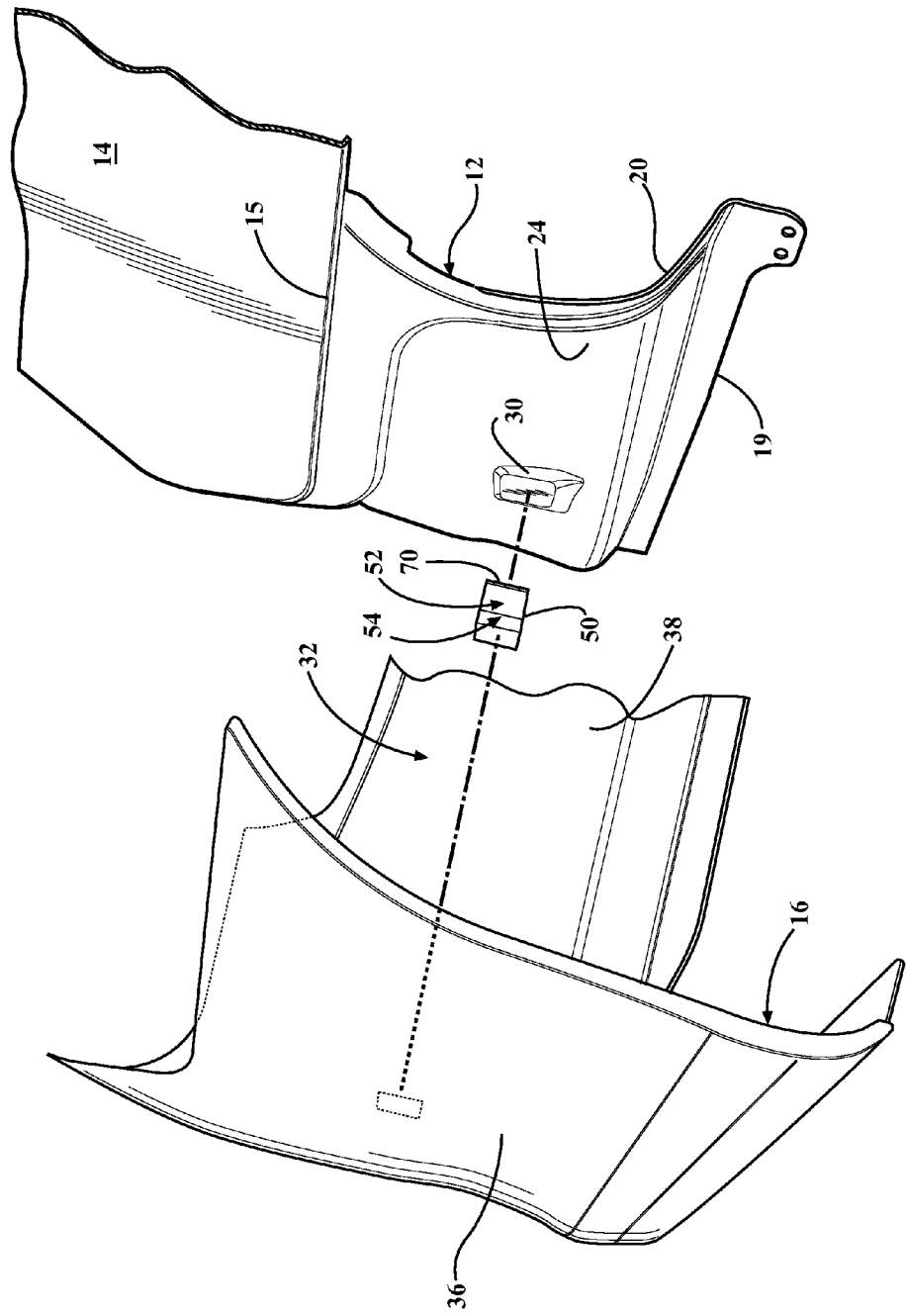
FIG. 5 is an exploded view of the bumper assembly of FIG. 2.

In this disclosure, FIGS. 1, 2 and 5 are directed to a representative embodiment of a bumper assembly 10 as disclosed herein. The bumper assembly 10 includes a bodyside outer element 12 that is suitably mounted to an associated vehicle structure 14. It is contemplated that the associated vehicle structure 14 can be what is sometimes referred to as body-in-white, frame, or other structure or substructural member associated with the automotive vehicle. In the embodiment depicted, the vehicle structure is what is known as the body-in-white. The bodyside outer element 12 can be attached to the associated vehicle structure 14 at a suitable location by any suitable means.

The bumper assembly 10 also includes outer bumper cover member 16. The outer bumper cover member 16 can attached either to the associated vehicle structure 14 or the bodyside outer element 12 depending on the specifics of the vehicle configuration. The outer bumper cover member 16 is in overlying spaced relationship to at least a portion of the bodyside outer element 12. In the embodiment depicted, the bumper cover member 16 can be in proximate contact with the bodyside outer element 12 at an upper edge 15 of the bumper assembly 10 when the bumper assembly 10 is in the use position.

The bumper cover member 16 and the bodyside outer element 12 can be configured such that the two members 12 and 16 diverge from one another to define an interior space therebetween. The bumper cover member 16 and the bodyside outer element 12 are positioned in spaced relationship from one another from a generally medial location to the lowermost location of the bumper assembly 10. In the embodiment depicted in the drawing figures, the spaced relationship between the bumper cover member 16 and the bodyside outer element 12 begins at approximately two to four inches from the upper edge 15 of the bumper assembly 10.

The bodyside outer element 12 is configured with a center region (not shown) and opposed side regions 18, 20. In the various drawing figures, the center region has been cut away for clarity. The opposed side regions 18, 20 can be connected to the center region in any suitable manner such that the opposed side regions 18, 20 are positioned rearwardly to the vehicular rear wheel wells. The center region and opposed side regions 18, 20 of the bodyside outer element 12 can be contiguously joined to one another in a continuous unitary manner if desired or required. Each opposed side region 18, 20 has an outwardly facing surface such as outwardly facing surfaces 22, 24. Similarly, the center region of the bodyside outer element can have an outwardly facing surface.

The opposed side regions 18, 20 can have surface configurations and contours which are symmetrical to one another or can vary depending on issues of stack up and packaging of various automotive components associated with the finished vehicle. Thus the opposed side regions 18, 20 can have various apertures, contours etc. to accommodate various associated devices. In the embodiments depicted, the opposed side regions 18, 20 can each have a suitable compression member attachment location.

The compression member 50 can be located at any suitable location on the respective opposed side region 18 and/or 20 at a point that is generally in a region that is bounded, in the up-and-down direction, by the medial line between the upper edge 15 of the bumper assembly 10 and the lower edge 19 of the respective opposed side region 18, 20 of the body side outer element and a line located approximately 20% below the upper edge 15. The compression attachment location can be positioned at a generally central lateral direction. In certain embodiments, the attachment location of the compression member 50 can be positioned at a location that is generally rearward of the center of the respective opposed side region 18, 20.

The attachment location of compression member 50 can be configured with a suitable mounting surface such as emboss 30 where desired or required in order to define and position an associated compression member 50. In the embodiment depicted in FIGS. 1, 2 and 5, the emboss 30 is configured as a rectangular region projecting upward from the associated outwardly facing surface 22, 24 of the respective opposed side region 18, 20. The emboss 30 can have any configuration suitable for positioning and orienting the associated compression member 50.

The outer bumper cover member 16 can have any suitable geometric configuration to permit overlying coverage of at least a portion of the associated bodyside outer element 12. In the embodiment depicted in the drawing figures, the outer bumper cover member 16 is composed of a center region 32 and opposed side regions 34, 36 connected to the center region 32 projecting angularly outward therefrom. The opposed side regions 34, 36 can be connected to the center region 32 by any suitable means. In the embodiment depicted, the opposed side regions 34, 36 are contiguously joined to the center region 32 as a unitary molded element. When installed on the associated automotive vehicle, the center region 32 overlies either the front or rear region of the vehicle. Generally, the bumper cover member 16 will have a cross sectional thickness sufficient to provide structural integrity to the bumper cover member 16. It is contemplated that the thickness will be limited by considerations such as component body weight and the like. Where desired or required, the thickness of the bumper cover member 16 will vary depending on the height and lateral location on the bumper cover member 16. In certain instances, the average thickness of the bumper cover material in the central portion of the opposed side regions 34, 36 will generally have a minimum sufficient thickness to provide structural contour along with minimum weight.

The bodyside outer element 12 can be composed of any suitable structural material. The material of choice will be one that provides structural strength and stability and can dampen and/or transfer externally originating force into and through the bodyside outer element 12 and to the associated structure as required. In various applications, the bodyside outer member 12 can be composed of a suitable structural metal or metal alloy. The bumper cover member 16 can be composed of suitable light-weight aesthetically appropriate material such as various polymeric materials including, but not limited to, various engineered plastics. In various embodiments, the bumper cover member 16 can project below and beyond the bodyside outer element 12 in suspended relationship thereto.

The bumper assembly 10 as disclosed herein also includes at least one compression member 50 that is interposed between the outwardly facing surface of the bodyside outer element 12 (such as outwardly facing surface 22, 24 and the second or inwardly oriented face 38 of the outer bumper member 16. The compression member 50 can be attached to the outwardly facing surface of the bodyside outer element 12 such as outwardly facing surface 22 and/or 24 by any suitable means. In certain embodiments, it is contemplated that attachment can be accomplished by various mechanical mechanisms, chemical/adhesive mechanisms or combinations of the two. In the embodiment depicted in the drawing figures, the compression member 50 is connected to the bodyside outer element 12 by a suitable chemical adhesive component configured to adhere the compression member 50 to the associated outwardly facing surface.

Figure 3:
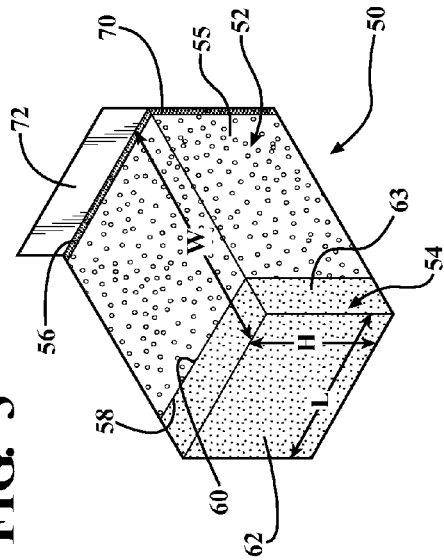
FIG. 3 is a perspective view of an embodiment of the compression member as disclosed herein.
Figure 4:
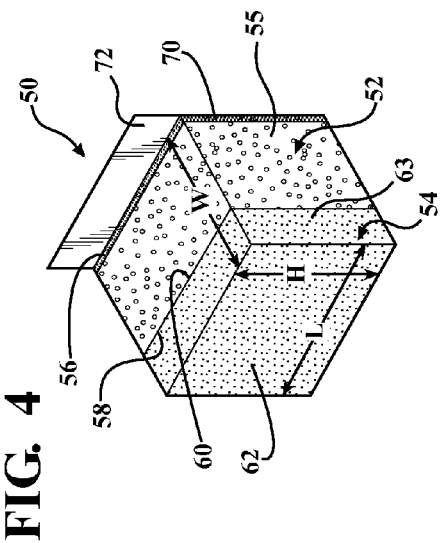
FIG. 4 is a perspective view of an embodiment of the compression member as disclosed herein.

The compression member 50 can be configured to be interposed between the bodyside outer element 12 and the outer bumper cover 16. Two embodiments of the compression member 50 are depicted in FIGS. 3 and 4. The compression member 50 as disclosed herein includes at least one first compressible region 52 and at least one second compressible region 54. Each compressible region has a compressibility value with the first compressible region 52 having a compressibility value $V_1$ and the second compressible region 54 having a second compressibility value $V_2$. In the compression member 50 as disclosed herein, the second compressibility value $V_2$ is greater than the first compressibility value $V_1$. At least the second compressible region 54 is made of a foamed polymeric material.

The first compressible region 52 of the compression member 50 is a generally three-dimensional geometric shape and includes a first face 56 and a second face 58 that is generally opposed to the first face 56. In the embodiment depicted in FIGS. 3 and 4, the first and second faces 56, 58 are generally planar and are disposed in essentially spaced parallel relationship to one another. When in position in the bumper assembly 10, the first face 56 of the first compressible region 52 can contact the respective outer face 22, 24 of associated region 18, with the second face 58 in parallel opposed relation to the first face 56. The first compressible region 52 can be configured as a solid member that includes an outer side surface 55 that is interposed between the first and second faces 56, 58.

The second compressible region 54 is also a three-dimensional geometric shape that includes a first face 60 and a second face 62 that is generally opposed to the first face 60 as well as an outer side surface 63 interposed between the first and second faces 60, 62. As with the first compressible region 52, in the embodiment depicted in FIGS. 3 and 4, the first and second faces 60, 62 of the second compressible region 54 are generally planar and are disposed in essentially parallel relationship to one another with the first face 56 of the first compressible region 52 being in general parallel spaced relationship with the second face 62 of the second compressible region 54.

The first compressible region 52 and the second compressible region 54 can be connected to one another by any suitable means including, but not limited to, the interposition of various intermediate members or elements therebetween. In the embodiment depicted in FIGS. 3 and 4, the first compressible region 52 is in direct bonded contact with the second compressible region 54. Bonded contact can be achieved by any suitable means including, but not limited to, direct adhesive contact between the two regions or interposition of a suitable adhesive material to bond the two respective compressible regions 52, 54.

In the embodiment depicted in the FIGS. 3 and 4, the outer side surfaces, 55, 63 are positioned contiguous to one another to form a continuous planar surface. Without being bound to any theory, it is believed that the contiguous, continuous planar side surface(s) formed by side surfaces 55, 63 provides a structure that enhances vibrational dampening characteristics of the compression member 50 by either self-dampening or vehicular transmission and dissipation of vibration initiated in the bumper cover member 16 as during operation.

The second compressible region 54 is composed of a polymeric foam material in various embodiments as depicted. The polymeric foam material can be a suitable compressible material such as closed cell or semi-closed cell expanded polymeric foam material. The compressibility values can be expressed in suitable terms or values. In general, compressibility values can be derived from values such as indentation force deflection (IFD) which is a measurement of foam firmness. It is understood that firmness values can be independent of foam density although it is often thought that higher density foams are firmer. IFD is measured by indenting or compressing a foam sample to 25 percent of its original height. The amount of force in pounds required to indent the foam to this level is its 25% IFD measurement. The more force required, the firmer or less compressible the foam. The polymeric foam material utilized in the second compressible region 54 will have a 25% IFD that is between about 10 lbs. and 50 lbs. in various applications.

Suitable polymeric foam material employed in the second compressible region 54 can include expanded polyethylene, expanded polypropylene, expanded ionomeric alkylene copolymers as well as mixtures of such materials. Non-limiting examples of such materials include various grades of foamed or expanded ethylene propylene terpolymers such as EPDM or EPM. Without being bound to any theory, it is believed that the EPDM (ethylene propylene diene monomer (M-class) rubber) is a synthetic rubber which is an elastomer that includes a saturated polymethylene-type chain in which the "M" refers to its classification in ASTM standard D-1418. Suitable EPDM materials can have an ethylene content between about 45% to 75%. Dienes used in the manufacture of EPDM rubbers include, but need not be limited to, cicyclopentanadiene, ethylidene norbornene, and/or vinyl norbornene. It is believed that the EPM is ethylene propylene rubber in which the "M" refers to its classification in ASTM standard D-1418.

The material of choice will be a material having a semi-closed cell structure having durability and weather-resistance cold/heat test (−20° C. to 100° C.) and a low specific gravity of approximately 0.11. The material can have a compressibility value as expressed as IFD between about 10 lbs. and about 50 lbs. Non-limiting examples of suitable foamed material that can be employed in the second compressible region 54 include EPT sealer material distributed under the tradename EE-1000 from Nitto Denko. It is believed that the EPT sealer material can have suitable self-adhesive characteristic when produced in contact with various polymeric foam or non-foam substrates.

The first compressible region 52 can be composed of a suitable compressible material. In the embodiment as disclosed herein, the compressible material can be a foamed polymeric material. The foamed polymeric material employed in the first compressible region 52 will be one that has a compressibility value $V_1$ that is less than that of the second compressible region 54 ($V_2$). The material may have a compressibility value as expressed as IFD that is between about 30% and about 70% in some applications provided that the material employed in the first compressible region 52 has an IFD that is greater than the IFD of the second compressible region 54. Non-limiting examples of suitable foamed polymeric materials include expanded polyethylene, expanded polypropylene, expanded ionomeric ethylene copolymers and the like. A non-limiting example of foamed or expanded polymeric material are materials commercially available under the tradename A061F from Nitto Denko.

The compression member 50 can be configured with suitable dimensions and have a suitable outer geometric configuration. In the embodiment disclosed herein, the compression member 50 has a width W that is measured from the first face 56 of the first compressible region 52 to the second face 62 of the second compressible region 54. In various embodiments, the first compressible region 52 constitutes between 60% and 95% of the width W of the compression member 50. In certain embodiments, the first compressible region 52 constitutes between 80% and 95% of the width W of the compression member 50.

In the embodiment depicted in FIGS. 3 and 4, the compression member 50 is configured as a rectangular member. In addition to width W, the compression member 50 has a length L and height H. In certain configurations, the value of width W is greater than either of the value of the length L and/or the value of the height H. In certain configurations, the value of the height H can be essentially equal to the value of length L.

The compression member 50 can be of any suitable size and configuration. In various configurations, the compression member 50 will occupy a volume that is less than 20% of the volume defined between the bodyside outer element 12 and the outer bumper cover member 16, with volumes less than 10% being possible in certain applications. It is contemplated that the bumper assembly 10 as disclosed herein will include one or more discrete compression members 50. In certain embodiments, it is contemplated that the bumper assembly 10 will have one compression member 50 associated with each of the opposed side members 18, 20.

The compression member 50 is interposed between the bodyside outer element 12 such that the first compressible region 52 is in fixed relationship to the outwardly facing surface 22 or 24 of the respective associated opposed side region 18 or 20. Where desired or required, the compression member 50 can be configured with a suitable adhesive layer 70 that is connected to the first face 56 of the first compressible region 52 to facilitate adhesion of the compression member 50. The compression member 50 projects outward from the outwardly facing surface 22 or 24 of the associated opposed side region 18 or 20 to an outer surface defined by the second face 62 of the second compressible region 54 such that the second compressible region 54 is outermost relative to the compression member 50 and the associated opposed side region 18 or 20.

The outer bumper cover member 16 is in overlying relationship to the associated opposed side region 18, 20 such that the inwardly oriented surface 38 of the outer bumper cover member 16 rests in contact with the polymeric foam material of the second compressible region 54, particularly the second face 62 of the second compressible region 54, when the bumper assembly 10 is in the use position. "Resting in contact" as that term is used herein, is defined as physical contact between the inwardly oriented surface 38 of the bumper cover member 16 and the second face 62 of the second compressible region 54 at minimum. When in the use position, the bumper cover member 16 can exert compressive force on the second face 62 of the second compressible region 54. The compressive force that is exerted will be one that achieves less than full compression of the polymeric foam material in the second compressible region 54. In various configurations, the compression of the second compressible region 54 will be between 5% and 25% of the non-compressed width of that region.

Oscillation or rippling movement that is induced in the associated opposed side regions 34, 36 and optionally in the center region 32 of the outer bumper cover member 16 as a result of road vibration, wind movement or the like is transmitted into the compression member 50. Vibration transmitted into the compression member 50 can be at least partially dampened by the characteristics of the foamed polymeric materials present in the compression member 50. It is also contemplated that any vibration that is not dampened can be transmitted through the compression member 50 into the associated bodyside outer element 12 in a manner that cancels at least a portion of visibly perceivable vibration.

Without being bound to any theory, it is believed that the vibration induced in the outer bumper cover 16 is initially transmitted to the second compressible region 54 through contact with the inwardly oriented surface 38 of outer bumper cover 16. It is believed that the compressibility characteristics of second compressible region 54 will dampen at least a portion of the vibration and/or oscillation of that occurs in the outer bumper cover 16. It is also believed that the second compressible region 54 can facilitate dampening action by the first compressible region 52 without increasing exterior visibility of the compression member 50.

The automotive bumper assembly 10 can include one or more compression members 50 that are positioned in appropriate spaced relation at defined locations in the automotive bumper assembly 10. In the embodiment depicted-FIGS. 1, 2 and 5, the automotive bumper assembly 10 includes two compression members 50 that are located at generally central points relative to the respective opposed side regions of the bodyside outer element 12. The compression members 50 can be asymmetrically disposed relative to one another as illustrated in the drawing figures if desired or required.

Also disclosed is an individual compression member 50 configured to be positioned in a preexisting automotive bumper assembly. The individual compression member 50 is a three-dimensional geometrically-shaped device that includes a first compressible region 52 and a second compressible region 54 in stacked relationship to one another. In various embodiments, the geometrically-shaped device can have a cylindrical or rectilinear configuration with the embodiment depicted in FIGS. 3 and 4 being directed to a rectilinear three-dimensional configuration.

The individual compression member 50 has a first compressible region 52 having a first compressibility value $V_1$ and a second compressible region 54 having a second compressibility value $V_2$. The second compressibility value $V_2$ is greater than the first compressibility value $V_1$. The first compressible region 52 has a first face 56 and an opposed second face 58 as well as an outer side edge region 55 interposed therebetween. Similarly the second compressible region 54 has a first face 60, an opposed second face 62 and a side edge region 63 interposed therebetween. The compressible regions 52, 54 can be affixed directly to one another or can have a suitable adhesive layer interposed therebetween.

The second compressible region 54 of compression member 50 is made from a suitable polymeric foam material such as an expanded polyolefin foam selected from the group consisting of expanded polyethylene, expanded polypropylene, expanded ionomeric ethylene copolymers, and mixtures thereof. Such materials were discussed previously in conjunction with the bumper assembly 10. It is also contemplated that the first compressible region 52 can be made from the polymeric foam materials including, but not limited to, expanded synthetic elastomer selected from the group consisting of ethylene propylene rubbers, ethylene diamine propylene rubbers, and mixtures thereof as discussed previously in conjunction with the bumper assembly 10.

The compression member 50 can have a suitable attachment member connected to the first face 56 of the first compressible region 52. The attachment member can be composed of a suitable chemical adhesive material. In certain embodiments, the chemical adhesive material is one that is capable of providing a suitable essentially permanent bond between the compressible region 52 and an associated substrate surface such as the bodyside outer element 12 of an automotive vehicle. The associated substrate surface can be either metal or a suitable engineered plastic. Non-limiting examples of suitable chemical adhesives include acrylics, epoxys, cyanoacrylates, vinyls and various combinations of these materials.

In certain embodiments, the adhesive layer 70 can be composed of an acrylic layer or layers. In a multilayer adhesive configuration, the adhesive layer is composed of a foamed acrylic layer interposed between two non-foamed acrylic adhesive layers. Suitable materials will exhibit a peel adhesion on primed or painted surfaces between about 28 and 50 N/25 mm at ambient temperature with shear adhesion at room temperature between 0.50 and 1.30 MPa. One non-limiting example of such material is commercially available from Nitto Denko under the tradename Hyperjoint. It is believed that such material is double-coated acrylic foam.

The compression member 50 may also include a suitable polymeric release film 72. The release film can be made from any suitable polymeric film such as various polyethylenes and the like.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An automotive bumper assembly configured to be connected to an associated vehicle structure, the automotive bumper assembly comprising:
   a bodyside outer element mountable to the vehicle structure, the bodyside outer element having at least one center region and opposed side regions contiguously connected to the at least one center region, wherein the at least one center region and the opposed side regions each have an outwardly facing surface;
   an outer bumper cover member connected to the associated vehicle, the outer bumper cover member having a first outwardly oriented surface and a second inwardly facing surface, the second inwardly facing surface opposed to the first outwardly surface, wherein the second inwardly facing surface of the outer bumper cover member overlies at least a portion of the outwardly facing surface of the bodyside outer element with a spaced distance existing between the second inwardly facing surface of the bumper cover member and the outwardly facing surface of the bodyside outer element;

a compression member interposed between the outwardly facing surface of the bodyside outer element and the second inwardly facing surface of the outer bumper cover member, the compression member including:
a first compressible region having a first face and an opposed second face, the first compressible region having a first compressibility value; and
a second compressible region having a first face and an opposed second planar face, the second compressible region having a second compressibility value, wherein the first face of the second compressible region is connected to the second face of the first compressible region, wherein the second compressibility value is greater than the first compressibility value,
wherein the compression member is oriented such that the first compressible region contacts the outwardly facing surface of the bodyside outer element and the opposed second planar face of the second compressible region is rests in contact with the second inwardly facing surface of the outer bumper cover member and wherein at least the second compressible region is made of a foamed polymeric material.

2. The automotive bumper assembly of claim 1, wherein the compression member is located in interposed relationship between the bumper cover member and the bodyside outer element on at least one of the opposed side regions of the bodyside outer element.

3. The automotive bumper member assembly of claim 2, having a use position, wherein the automotive bumper assembly has an upper edge when in the use position and wherein the outer bumper cover contacts the bodyside outer element proximate to the upper edge such that the outwardly facing surface of the bodyside outer element and the second inwardly facing surface of the outer bumper cover member define a final spaced distance that is located proximate to a lower edge defined in the bodyside outer element and define an intermediate spaced distance location, the intermediate spaced distance location being measured at a location intermediate between the upper edge of the bodyside outer element and the lower edge defined in the bodyside outer element, wherein the final spaced distance has a final spaced distance value and the intermediate spaced distance location has an intermediate spaced distance value, and wherein the compression member is positioned at the location intermediate between the upper edge of the bodyside outer element and the lower edge defined in the bodyside outer element.

4. The automotive bumper member assembly of claim 1 wherein the compression member has a width W as measured from the first face of the first compressible region to the second face of the second compressible region, and wherein the first compressible region composes between 60% and 95% of the width W of the compression member.

5. The automotive bumper member assembly of claim 4 wherein the first compressible region composes between 80% and 95% of the width W of the compression member.

6. The automotive bumper assembly of claim 5 wherein the compression member is configured as a rectangular member having the width W, a length L and a height H, wherein the width W has a value that is greater than either of the length L and the height H.

7. The automotive bumper assembly of claim 1 wherein the assembly comprises at least two compression members positioned in interposed relationship between the bumper cover and the bodyside outer element at positions relative to the opposed side regions.

8. The automotive bumper assembly of claim 7 wherein the two compression members are asymmetrically disposed relative to one another.

9. An automotive bumper assembly configured to be connected to an associated vehicle structure, the automotive bumper assembly comprising:
a bodyside outer element mountable on the associated vehicle structure, the bodyside outer element having at least one center region and opposed side regions contiguously connected to the at least one center region, wherein the at least one center region and the opposed side regions each have an outwardly facing surface;
an outer bumper cover member connectable to the associated vehicle structure, the outer bumper cover member having a first outwardly facing surface and a second inwardly facing surface, the second inwardly facing surface opposed to the first outwardly facing surface, wherein the second inwardly facing surface overlies at least a portion of the outwardly facing surface of the bodyside outer element with a spaced distance existing between the second inwardly facing surface of the outer bumper cover member and the outwardly facing surface of the bodyside outer element;
a compression member interposed between the outwardly facing surface of the bodyside outer element and the second inwardly facing surface of the outer bumper cover member, the compression member including:
a first compressible region, the first compressible region having a first face and an opposed second face, the first compressible region having a first compressibility value; and
a second compressible region, the second compressible region having a first face and an opposed second face, the second compressible region having a second compressibility value, wherein the first face of the second compressible region is connected to the second face of the first compressible region, and wherein the second compressibility value is greater than the first compressibility value;
wherein the compression member is oriented such that the first compressible region contacts the outwardly facing surface of the bodyside outer element and the second compressible region rests in contact with the second inwardly facing surface of the outer bumper cover member;
wherein the compression member has a width W as measured from the first face of the first compressible region to the second face of the second compressible region,
wherein the first compressible region of the compression member composes between 60% and 95% of the width W of the compression member; and
wherein the first compressible region of the compression member is composed of a first foamed polymeric material and the second compressible region is composed of a second foamed polymeric material, the second polymeric foam material being different from the first polymeric foam material.

10. The automotive bumper assembly of claim 9 wherein the first foamed polymeric material is an expanded polyolefin foam selected from the group consisting of expanded polyethylene, expanded polypropylene, expanded ionomeric ethylene copolymers, and mixtures thereof.

11. The automotive bumper assembly of claim 9 wherein the second foamed polymeric material is an expanded synthetic elastomer selected from the group consisting of ethylene propylene rubbers, ethylene diamine propylene rubbers, and mixtures thereof.

12. The automotive bumper assembly of claim 6 wherein the value of height H is equal to or less than the value of length L.

13. The automotive bumper assembly of claim 9 wherein the compression member further comprises at least one attachment member, the attachment member interposed between the outward facing surface of the at least one bodyside outer element and the first face of the first compressible region.

14. The automotive bumper assembly of claim 13 wherein the at least one attachment member is a chemical adhesive.

15. A compression member for use in an automotive bumper assembly having a bodyside outer element having an outwardly facing surface and an outer bumper cover member having an inwardly facing surface, the compression member comprising:
   a first compressible region, the first compressible region having a first face, an opposed second face and side regions extending between the first face and the opposed second face, the first compressible region composed of a first foamed polymeric material, the first compressible region having a first compressibility value, wherein the first face of the first compression region is configured to contact the outwardly facing surface of the bodyside outer element;
   a second compressible region, the second compressible region having a first face, an opposed second face and side regions extending between the first face and the opposed second face, the second compressible region composed of a second foamed polymeric material, the second compressible region having a second compressibility value, the second compressibility value being greater than the first compressibility value, the first face of the second compressible member connected to the second face of the first compressible region, wherein the opposed second face of the second compressible region has a face configured to rest in contact with the inwardly oriented face of the outer bumper cover member;
   wherein the compression member has a width W as measured from the first face of the first compressible region to the second face of the second compressible region, a height H and a length L and wherein the width W has a value greater than either the height H or the length L and wherein the first compressible region composes between 80% and 95% of the width W.

16. The compression member of claim 15 wherein the first foamed polymeric material of the first compressible region is an expanded polyolefin foam selected from the group consisting of expanded polyethylene, expanded polypropylene, expanded ionomeric ethylene copolymers, and mixtures thereof, and wherein the second foamed polymeric material of the second compressible region is an expanded synthetic elastomer selected from the group consisting of ethylene propylene rubbers, ethylene diamine propylene rubbers, and mixtures thereof.

17. The compression member of claim 15 further comprising at least one attachment member connected to the first face of the first compressible region, the attachment member comprising at least one chemical adhesive.

18. The compression member of claim 17 wherein the chemical adhesive is selected from the group consisting of acrylics, epoxys, cyanoacrylates, vinyls, and mixtures thereof.

* * * * *